United States Patent
Moeller

(10) Patent No.: US 6,739,439 B2
(45) Date of Patent: May 25, 2004

(54) CLUTCH AND BRAKE FOR ROTATING BODY

(75) Inventor: Hans Erik Moeller, Randers (DK)

(73) Assignee: Dronningborg Industries A/S (DK)

( * ) Notice: Subject to any disclaimer, the term of this patent is extended or adjusted under 35 U.S.C. 154(b) by 0 days.

(21) Appl. No.: 10/154,388

(22) Filed: May 23, 2002

(65) Prior Publication Data

US 2003/0000791 A1 Jan. 2, 2003

(30) Foreign Application Priority Data

Jun. 5, 2001 (GB) .......................................... 00113509

(51) Int. Cl.⁷ .............................................. F16D 67/02
(52) U.S. Cl. ........................ 192/18 R; 192/14; 56/11.3
(58) Field of Search ................ 192/18 R, 14, 192/66.2, 12 R, 15; 56/11.3

(56) References Cited

U.S. PATENT DOCUMENTS

| | | | | |
|---|---|---|---|---|
| 4,141,439 A | * | 2/1979 | Lunde et al. ................. | 56/11.3 |
| 4,205,509 A | * | 6/1980 | Miyazawa et al. ........... | 56/11.3 |
| 4,286,701 A | * | 9/1981 | MacDonald .............. | 192/18 R |
| 4,322,935 A | * | 4/1982 | Poehlman .................... | 56/11.3 |
| 4,333,303 A | * | 6/1982 | Plamper ...................... | 56/11.3 |
| 4,352,266 A | * | 10/1982 | Lloyd et al. ................. | 56/11.3 |
| 4,372,433 A | * | 2/1983 | Mitchell et al. .......... | 192/18 R |
| 4,466,233 A | * | 8/1984 | Thesman ...................... | 56/11.3 |
| 4,511,023 A | * | 4/1985 | Nagai ....................... | 192/18 R |
| 4,513,848 A | * | 4/1985 | Lo ............................ | 192/18 R |
| 4,524,853 A | * | 6/1985 | Nagai ....................... | 192/18 R |
| RE32,202 E | * | 7/1986 | Cody et al. .................. | 56/11.3 |
| 5,570,765 A | * | 11/1996 | Patridge ...................... | 192/15 |
| 6,464,055 B1 | * | 10/2002 | Wians ....................... | 192/18 R |

FOREIGN PATENT DOCUMENTS

| | | |
|---|---|---|
| GB | 738734 | 10/1955 |
| JP | 2002084804 | 3/2002 |

* cited by examiner

*Primary Examiner*—Saul Rodriguez
(74) *Attorney, Agent, or Firm*—MacMillan, Sobanski & Todd, LLC

(57) ABSTRACT

A drive mechanism for a rotating body having a rotatable shaft includes a clutch to selectively transmit torque input to the shaft, a brake to slow down rotation of the shaft upon disengagement of the clutch, and an actuator to engage and disengage the clutch and brake. The clutch and brake are each mounted on a mounting member which is movable with respect to the shaft in the axial direction thereof. The actuator includes an actuator member that is slidably mounted on the mounting member and an actuator to move the actuator member from a first position, in which the clutch is engaged and the brake is disengaged, and a second position, in which the clutch is disengaged and the brake is engaged.

8 Claims, 4 Drawing Sheets

CLUTCH AND BRAKE FOR ROTATING BODY

BACKGROUND OF THE INVENTION

The invention relates to clutch and brake arrangements for rotating bodies, and in particular to such arrangements for rotating bodies forming part of agricultural machines, such as combine harvesters.

Agricultural machines such as combine harvesters comprise rotating components such as a threshing drum and straw chopper. When working, these components rotate at high speeds. When the combine harvester experiences no load, components which have been running at working speeds continue to rotate for some time due to inertia.

When an operator has shut a machine down, particularly if he has turned off the engine or disengaged drive to a certain part, he does not expect certain components to continue to rotate. However, high inertia components will continue to rotate until the inertia dissipates. There is, therefore, a need to reduce the period in which high inertia components rotate when not under load.

SUMMARY OF THE INVENTION

According to the present invention, there is provided a drive mechanism for a rotating body. The body includes a rotatable shaft, and the drive mechanism includes a clutch to selectively transmit torque input to the shaft, a brake to slow down rotation of the shaft upon disengagement of the clutch, and an actuator means to engage and disengage the clutch and brake. The clutch and brake are each mounted on a mounting member that is movable with respect to the shaft in the axial direction thereof. The actuator means includes an actuator member that is slidably mounted on the mounting member and an actuator to move the actuator member from a first position, in which the clutch is engaged and the brake is disengaged, and a second position, in which the clutch is disengaged and the brake is engaged.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
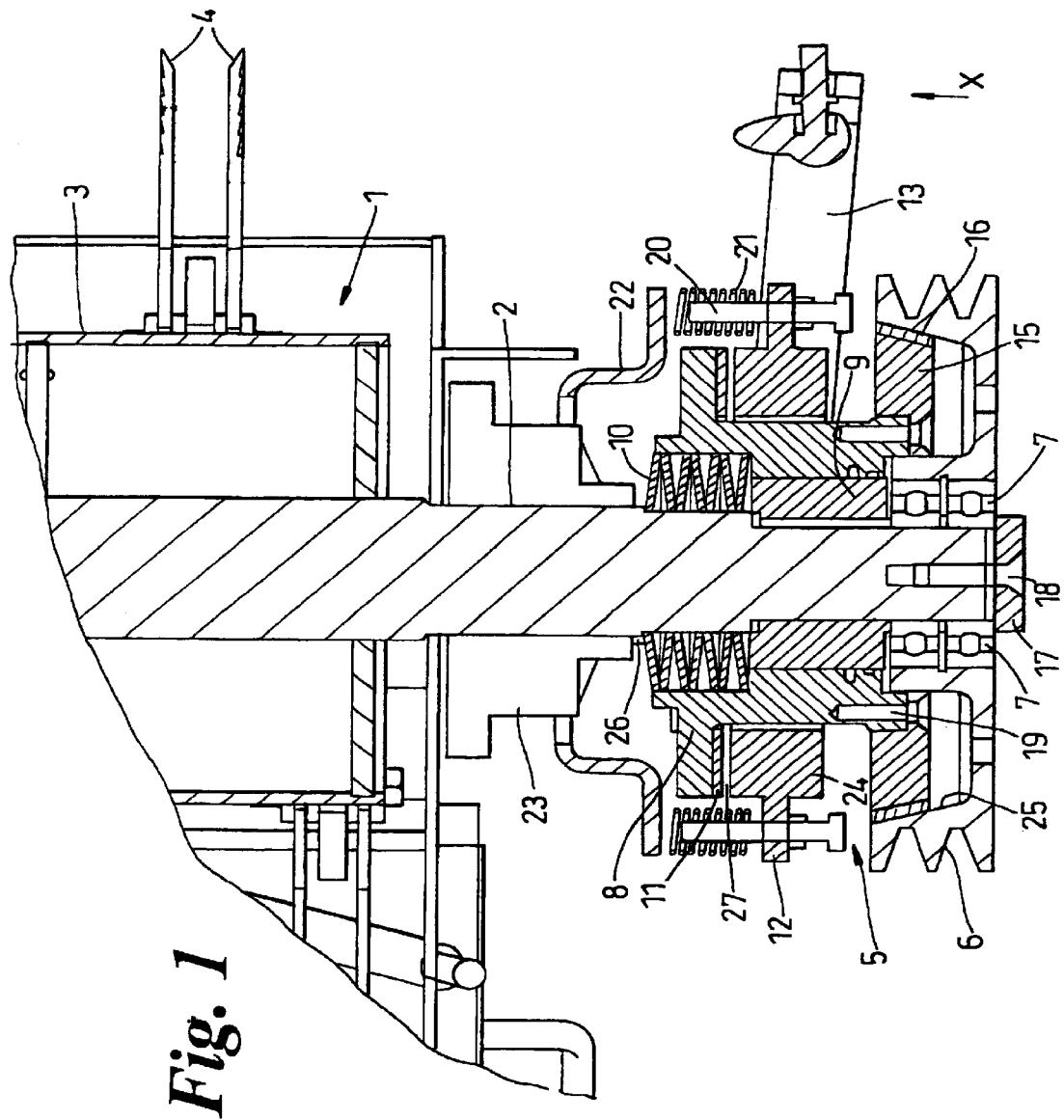
FIG. 1 illustrates in cross-section a straw chopper and clutch/brake assembly, with the clutch engaged and brake disengaged.

Referring now to FIG. 1, there is shown a straw chopper 1 comprising a rotatable shaft 2, which is mounted a drum 3 having blades 4 attached thereto. The shaft 2 is driven through a drive assembly 5 comprising a pulley wheel 6 attached to the shaft 2 by means of bearings 7. The pulley wheel can therefore rotate freely on the shaft 2 if such free rotation is not otherwise constrained.

The drive assembly 5 further comprises a bush 9 attached to the shaft 2, the bush 9 being fixed to the shaft 2 for rotation therewith. A mounting collar 8 is slidably mounted on the bushing 9, but is prevented from rotating by means of splines. A clutch member 15 is affixed to one end of the mounting collar 8 by means of bolts 19. The clutch member 15 comprises a friction surface 16 which engages with the inner surface 25 of the pulley wheel 6 under the force of the Belleville spring 10. As can be seen from FIGS. 1 and 2, the Belleville spring 10 fits around the shaft 2. One end of the Belleville spring 10 is constrained by a step 26 in the shaft 2. The other end of the Belleville spring 10 sits in a recess formed in the mounting collar 8. The Belleville spring therefore pushes the clutch 15 into engagement with the pulley wheel 6, thereby transmitting rotation of the pulley wheel to the shaft 2 to drive the straw chopper.

Lever 13 is connected to the mounting collar 8. Moving the lever moves the collar 8. Collar 8 is moved only when the thrust plate 24 touches the brake pad 11 and thereby moves the collar 8 i.e. only during braking.

The collar 8 comprises an outwardly extending portion having a brake pad 11 affixed to the surface of the said extending portion facing the pulley wheel 6. A ring 24 extends around the mounting collar 8 and is movable in the axial direction of the shaft 2. In FIG. 1 there is a gap 27 between the brake pad 11 and the surface of the ring 24. The gap 27 is present because the clutch 15 is engaged and there is no requirement to brake the shaft 2.

Extending radially outwards from the ring 24 is a pair of lugs 12, each lug of the pair mounting a bolt 20 having a coil spring 21 attached thereto.

Movement of the ring 24 in the axial direction of the shaft 2 is generated by a lever 13.

Figure 2:
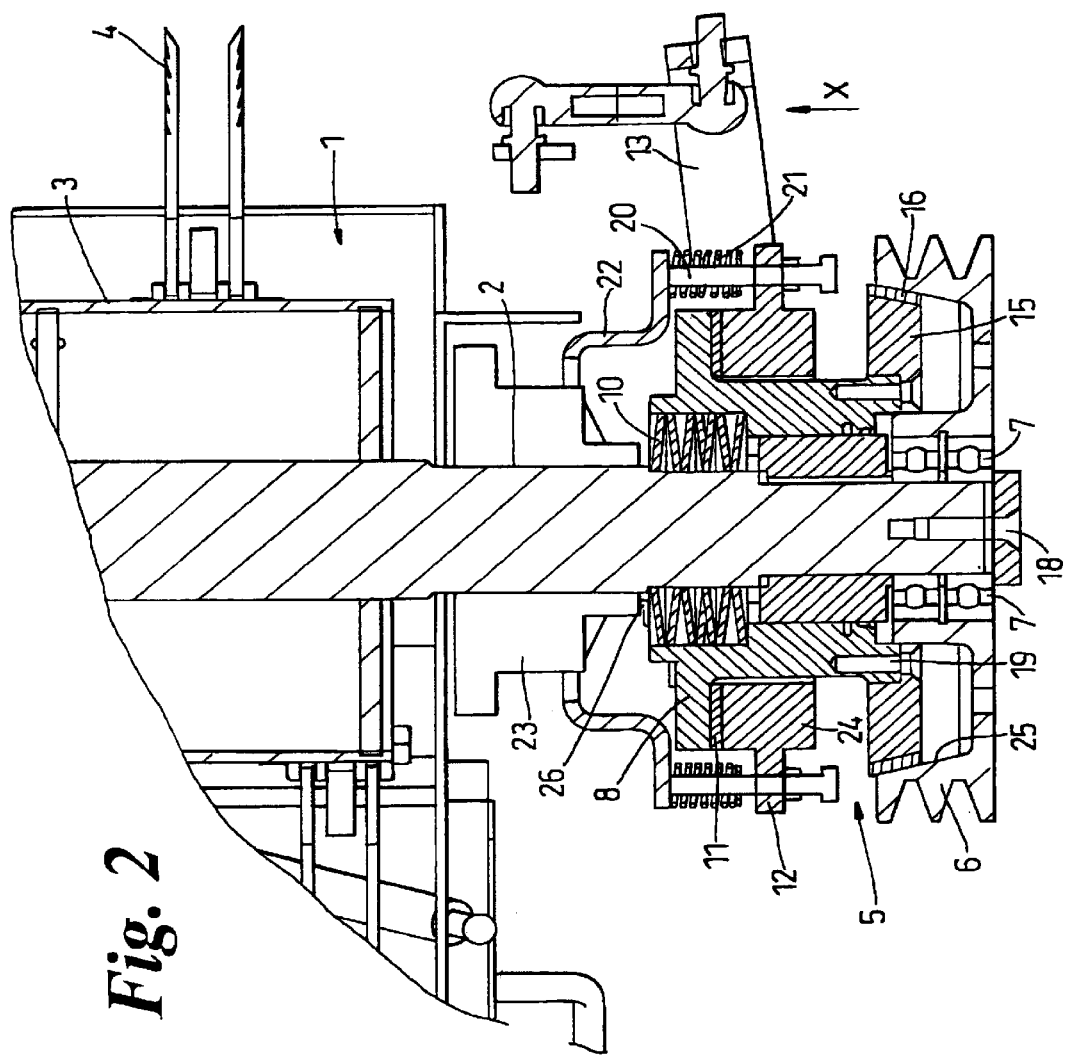
FIG. 2 illustrates in cross-section the straw chopper and clutch/brake assembly shown in FIG. 1, with the clutch disengaged and the brake engaged.

Referring now to FIG. 2, the drive unit 5 is shown in the state where the clutch is disengaged and the brake engaged. Transition to this state from the state shown in FIG. 1, where the clutch is engaged and the brake is disengaged is achieved by moving the lever 13 from the position shown in FIG. 1 to the position shown in FIG. 2. As the lever 13 is moved towards the body of the combine harvester in the direction X the gap 27 shown in FIG. 1 is closed and the inward facing surface of the ring 24 engages with the brake pad 11. As the lever is moved further in the direction X the ring 24 pushes the mounting collar 8 against the Belleville spring 10, compressing the spring further and lifting the clutch 15 out of engagement with the inner face 25 of the pulley wheel 6.

The bolts 20 and the springs 21 ensure that the thrust plate 24 is kept clear of the rotating hub 8 and the brake pad 11 when the brake is disengaged as shown in FIG. 1 (the bolt 20 may be adjusted to equalize the clearance between thrust plate 24 and brake pad 11 at the top and the bottom).

Figure 3:
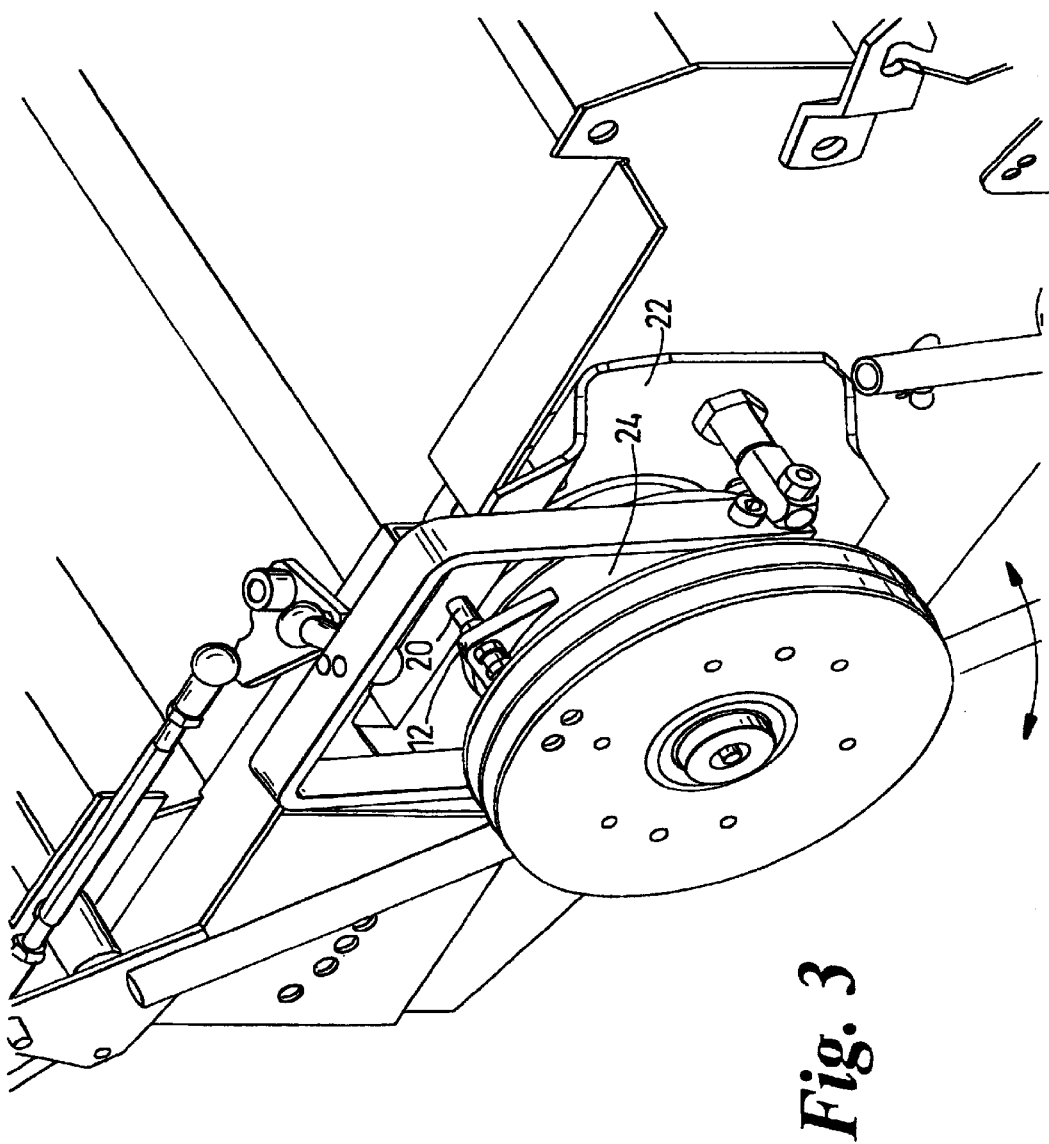
FIG. 3 is schematic representation of a rear portion of a combine harvester comprising a straw chopper driven via a clutch and brake assembly according to the invention.
Figure 4:
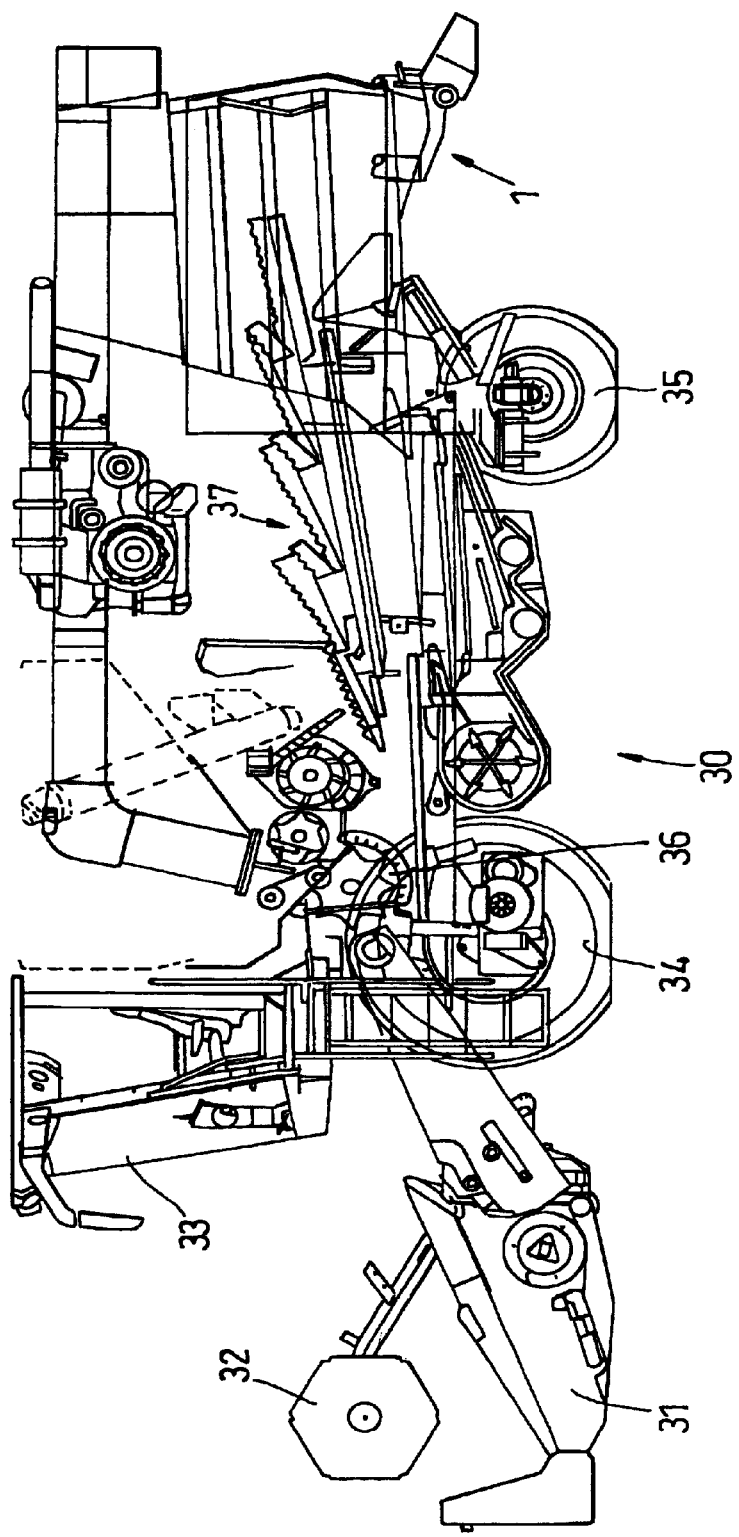
FIG. 4 is a side view of a combine harvester comprising a straw chopper driven via a clutch and brake assembly according to the invention.

Referring now to FIG. 4, there is shown a combine harvester 30 comprising a header 31, a reel 32, an operator's cab 33, front and rear wheels 34, 35, a threshing mechanism including a drum 36 and straw walkers 37, and at the rear of the combine harvester a straw chopper 1 as described in greater detail with reference to FIGS. 1 to 3.

The clutch and brake assembly of the invention is particularly advantageous because the rotating body (in this case a straw chopper) is brought to a halt by the brake when the clutch is disengaged.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A drive mechanism for a rotating body including a rotatable shaft comprising:

a clutch that is adapted to selectively transmit torque input to the shaft;

a brake that is adapted to slow down rotation of the shaft upon disengagement of the clutch; and an actuator means to engage and disengage the clutch and brake, wherein the clutch and brake are each mounted on a mounting member that is movable with respect to the shaft in the axial direction thereof, and wherein the actuator means comprises an actuator member that is slidably mounted on said mounting member and an actuator to move said actuator member from a first position, in which the clutch is engaged and the brake is disengaged, and a second position, in which the clutch is disengaged and the brake is engaged.

2. A drive mechanism according to claim 1 further comprising a biasing means to bias the mounting member into the clutch engaging position.

3. A drive mechanism according to claim 2 wherein the said biasing means comprises a Belleville spring surrounding the shaft, wherein one end of the Belleville spring engages with a step in said shaft to constrain movement of the mounting member along the shaft.

4. A drive mechanism according to claim 1 wherein said mounting member comprises a portion extending radially outwards, and wherein friction elements are affixed to said radially extending portion, and wherein the actuator member engages with the friction element to brake the shaft.

5. A drive mechanism according to claim 1 further including a torque input comprising a pulley wheel, and wherein the clutch comprises a friction surface which engages with the pulley wheel to transmit torque from the pulley wheel to the shaft.

6. A drive mechanism according to claim 1 wherein the actuator comprises a lever, and wherein movement of said lever is generated manually, hydraulically, pneumatically, or electrically.

7. A drive mechanism for a rotating body including a rotatable shaft comprising:

a clutch that is adapted to selectively transmit torque input to the shaft;

a brake that is adapted to slow down rotation of the shaft upon disengagement of the clutch; and an actuator means to engage and disengage the clutch and brake, wherein the clutch and brake are each mounted on a mounting member that is movable with respect to the shaft in the axial direction thereof, and wherein the actuator means comprises an actuator member that is slidably mounted on said mounting member and an actuator to move said actuator member from a first position, in which the clutch is engaged and the brake is disengaged, to a second position, in which the clutch is disengaged and the brake is engaged, wherein as the actuator member is moved from the first position to the second position, the brake is engaged before the clutch is disengaged.

8. A drive mechanism comprising:

a rotatable input wheel;

a rotatable output shaft;

a collar that is connected to said output shaft for rotation therewith and for axial movement relative thereto between a first position, wherein said collar engages said input wheel to rotatably drive said output shaft, and a second position, wherein said collar does not engage said input wheel and does not rotatably drive said output shaft; and a non-rotatable actuator for selectively engaging said collar to move said collar from said first position to said second position and thereby slow down rotation of said output shaft upon disengagement from said input wheel.

* * * * *